United States Patent [19]

Asano et al.

[11] 4,355,360
[45] Oct. 19, 1982

[54] METHOD FOR PROGRAM CONTROL OF COMPONENTS OF AN AUTOMOTIVE VEHICLE

[75] Inventors: Masaharu Asano, Yokosuka; Haruto Tanaka, Yokohama, both of Japan

[73] Assignee: Nissan Motor Company, Limited, Yokohama, Japan

[21] Appl. No.: 140,663

[22] Filed: Apr. 15, 1980

[30] Foreign Application Priority Data

Apr. 16, 1979 [JP] Japan .................................. 54-45321

[51] Int. Cl.³ .......................... G06F 15/20; G06F 9/46; G11C 7/00
[52] U.S. Cl. .............................. 364/431.11; 123/417; 123/489; 364/900; 364/431.06
[58] Field of Search ................... 364/900, 200, 431.04, 364/431.05, 431.06, 431.07, 431.08, 431.09, 431.10, 431.11, 431.12

[56] References Cited

U.S. PATENT DOCUMENTS

| | | | |
|---|---|---|---|
| 3,327,294 | 6/1967 | Furman et al. | 364/900 |
| 3,825,902 | 7/1974 | Brown et al. | 364/200 |
| 3,905,025 | 9/1975 | Davis et al. | 364/200 |
| 4,005,391 | 1/1977 | MacPherson | 364/200 |
| 4,035,780 | 7/1977 | Kristick et al. | 364/900 |
| 4,091,447 | 5/1978 | Dillon et al. | 364/200 |
| 4,152,761 | 5/1979 | Louie | 364/200 |
| 4,163,282 | 7/1979 | Yamada et al. | 364/431 |
| 4,201,159 | 5/1980 | Kawai et al. | 364/431 X |
| 4,201,161 | 5/1980 | Sasayama et al. | 364/431 X |
| 4,229,793 | 10/1980 | Yoshida et al. | 364/431 |
| 4,231,091 | 10/1980 | Motz | 364/431 |
| 4,282,573 | 8/1981 | Imai et al. | 364/431 |

OTHER PUBLICATIONS

Korn, G. A., Microprocessors and Small Digital Computers System for Engineers and Scientists, (Textbook), McGraw-Hill Book Co., 1977, (Scientific Library), pp. 2, 141-149, 261-267.

Primary Examiner—Felix D. Gruber
Attorney, Agent, or Firm—Schwartz, Jeffery, Schwaab, Mack, Blumenthal & Koch

[57] ABSTRACT

According to the method, a plurality of sensor signals are generated related to vehicle operating parameters. Interruption signals are produced in response to certain sensor signals and cause execution of a main control program to be interrupted. Data related to the main control program are transferred to an auxiliary memory. An interruption processing program is executed in a non-interruptible state to determine the source of the interruption signal, after which an interruption program related to the received interruption signal is executed. The interruption program is interrupted in response to each additional interruption signal and data related to the interrupted interruption program is stored in an auxiliary memory. The interruption processing program is then re-executed and a FLAG is stored identifying the interruption program related to each additional interruption signal. Execution of the interruption program related to the first interruption signal is then continued and followed by execution of interruption programs related to the additional interruption signals in an order determined by the stored FLAGs.

5 Claims, 7 Drawing Figures

METHOD FOR PROGRAM CONTROL OF COMPONENTS OF AN AUTOMOTIVE VEHICLE

BACKGROUND OF THE INVENTION

1. Field of the Invention

The present invention relates generally to an automatic electronic control system comprising a microcomputer system and mounted on an automotive vehicle for controlling various vehicle devices, such as an internal combustion engine, a spark ignition system, an exhaust gas recirculation system, various driver indicators, and so on. More particularly, the present invention relates to the method used in an interrupt processing system in a multiprogramming system of the microcomputer system for controlling the various vehicle devices.

2. Description of the Prior Art

As is known to those skilled in the art, recently it has become quite popular to control various vehicle devices with a microcomputer system. The microcomputer in an automotive vehicle control system is operated so as to control various vehicle devices with reference to data values inputted from various sensors. For example, in the case of controlling an internal combustion engine, sensor signals inputted and processed in the microcomputer may be engine speed, air flow rate, engine or coolant temperature, or the switch position of various electrical switching means. In such an automatic control system for an automotive vehicle, there is often included a multiprogramming system for processing various data values inputted into the computer so as to perform various control operations for various vehicle devices in properly sequenced priority. The multiprogramming system contains various routines, some of which process the data values at relatively high speed and others of which process the inputs at relatively ordinary speed.

Generally, the higher speed processing routines are interrupt processing routines, which include a schedule control routine. During execution of the schedule control routine, priority will be provided to each of the interrupt processing routines to be executed in response to interrupt signals. The priority of each interrupt processing routine is determined, depending on the priority of the corresponding interrupt signals.

In such a conventional interrupt processing system, resource allocation is relatively frequently made for transferring or rolling out routines undergoing processing to an auxiliary memory together with data which is being processed. Routines to be executed are assigned priorities when a relatively lower priority routine is being executed and an interrupt signal commanding execution of a routine with a relatively high priority is inputted, the operation of the microcomputer enters into an interrupt state, and thereby the routine which has previously been undergoing processing is interrupted and transferred out of the main unit or CPU. The entire routine does not have to be transferred. Only enough data values to represent the routine and the point at which execution stopped need be stored. These values may comprise the contents of the program counter (stored in two bytes), the index register (stored in two bytes), the accumulator (stored in two bytes) and the condition code register (stored in one byte). After execution of the interrupt routine which has relatively high priority, the previous interrupted routine with its relevant data values is returned to the main unit for its execution to be continued. According to such a conventional interrupt processing system, there is required a large capacity auxiliary memory for transferring the interrupted programs. This necessity is made more clear by considering multiple interrupts which occur within a short period of time, during which the processing of none of them can be completed. For example, when five different interrupt signals are inputted during execution of an ordinary routine, transfers will take place five times. In practice, for temporarily storing interrupted routines, a random access memory generally has been used (hereinafter referred to as a RAM) in the microcomputer unit. In the case of Motorola's microcomputer Model No. 6800, for example, for transferring one routine, altogether, seven bytes of RAM are used. Therefore, in such a system, when transfers occur five times, a total of thirty-five bytes of RAM must be used for temporarily storing the interrupted routines. In the case of the above-mentioned Motorola's Model No. 6800, there is generally provided a hundred and twenty-eight bytes of RAM. Therefore, if there are reserved thirty-five bytes of RAM for transfer, the average capacity of the RAM for use in execution of routines will be restricted. This may cause difficulty structuring programs or routines. However, although in the conventional system a relatively large capacity of memory is required for transfer, multiple simultaneous interruptions may not occur very frequently. Therefore, in the conventional interrupt processing system, some bytes of RAM are not often used, but are reserved for transfers which possibly may not take place, thus causing inconvenience of programming or high cost of such a multiprogramming system.

SUMMARY OF THE INVENTION

Therefore, it is an object of the present invention to provide an automatic electrical control system to be mounted on an automotive vehicle for controlling various vehicle devices, the control system including a microcomputer system having a multiprogramming system operated of a method capable of processing interrupts using a relatively small capacity of memory for transferred routines.

Another object of the present invention is to provide a control system and method for operating the system capable of processing interrupts in a multiprogramming system without transferring the program so many times.

A further object of the present invention is to provide a control system operated by a method including a step for setting interrupt flags in response to interrupt signals whereby the flag is temporarily stored in a register and is sought after execution of the interrupt processing program in a given order.

To improve on the above-mentioned disadvantages of the prior art, various ways for reducing the capacity of auxiliary memory used for storing interrupted routines are used. One of the ways for reducing the capacity of auxiliary memory is to provide a system which processes interrupts in the following manner:

when an interrupt signals of either higher or lower priority are inputted, during execution of an interruption routine, interrupt flags are set in response to the interrupt signals and the flags are temporarily stored in a register; and after finishing execution of the previous routine, the interrupt flags are sought in a given order and a routine corresponding to an interrupt flag which is detected at first, is executed.

Thus, such a method for processing an interrupt in a multiprogramming system according to the present invention can reduce the capacity of memory for storing transferred routines and therefore can increase flexibility for programming. Further, in accordance with the present invention can also reduce the cost for the system.

A still further object of the present invention is to provide a control system which can process interrupts in a multiprogramming system while transferring programs only twice.

Other objects and advantages sought in the present invention will become apparent from the hereinafter described preferred embodiment of the invention.

BRIEF DESCRIPTION OF THE DRAWINGS

The present invention will become more fully understood from the appended drawings, and the accompanying description of a preferred embodiment of the present invention, which, however, are not to be taken as limitative of the present invention in any way, but are for the purpose of illustration and explanation only.

In the drawings

DESCRIPTION OF THE PREFERRED EMBODIMENT

Figure 1:
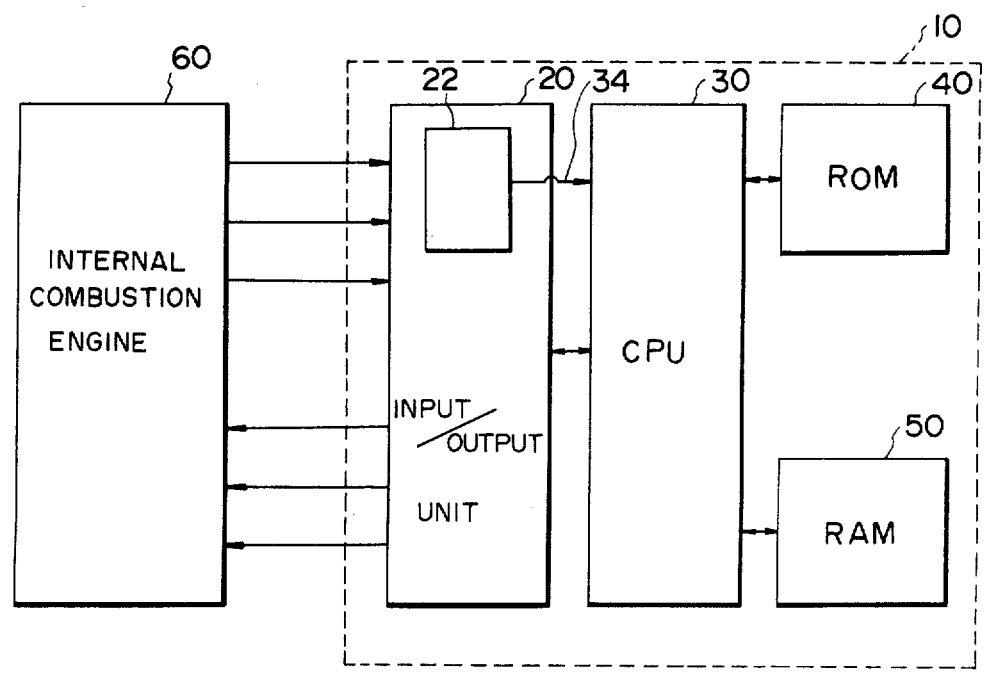
FIG. 1 is a general schematic block diagram of an automatic control system using a microcomputer, for an automotive vehicle, showing the general construction of the control system.

Referring now to the drawings, and particularly to FIG. 1, there is illustrated and shown a general structure of a microcomputer system used as an automatic control system for an automotive vehicle. A microcomputer 10 generally comprises an intput/output unit 20, a central processing unit (CPU) 30, a read only memory (ROM) 40 and a random access memory (RAM) 50. Although there is illustrated a specific structure of the microcomputer system, this should not be considered as limitative of the present invention. The invention is applicable to various structures of microcomputer systems which can operate to control various devices of an automotive vehicle. Indeed, although hereafter there is described the operation of a microcomputer system with respect to controlling an internal combustion engine, this should also not be considered as limitative of the of invention, which is applicable to various operations of a microcomputer system for controlling various vehicle devices, for example, a spark ignition system, an EGR system, driver indicators, and so on. Therefore, although reference numeral 60 denotes an internal combustion engine and driving and/or operating means therefor in the drawing, this should be taken as illustrative for purposes of explanation only, and no limitation is intended to the present invention by the description given hereinafter of an embodiment.

In practice, various input data fed from various sensors are processed for performing control operations by the microcomputer 10. For controlling the operation of the internal combustion engine 60, data with respect to, for example, engine speed, intake air flow rate, engine temperature, coolant temperature, switching positions of various control switches, such as a throttle valve switch, and so on are inputted as control input parameters. The input signals fed from the sensors are inputted to the input/output unit 20. In the input/output unit 20, these input signals, which are various types of signals, such as analog signals, ON/OFF signals, and so on, are converted into digital code so as to be in a form, suitable for the microcomputer 10. The digitalized input data are then fed to the CPU 30 to be processed by execution of a program previously stored in the ROM 40. During execution of this program, output signals for controlling, for example, fuel injection rate, spark advance, exhaust gas recirculation rate, and so on, are generated and fed to the internal combustion engine 60 so as to automatically control operation thereof.

The ROM 40 contains a plurality of various programs to be read by and obeyed by the CPU 30. The CPU 30 processes these programs in a multiprogramming system mode. For controlling operation of various programs in the CPU 30, an interrupt is performed in response to an interrupt signal. In the shown embodiment, which will be hereafter described in detail, the programs stored in the ROM are as follows:

first program: When an interrupt request signal is inputted, determines the interrupt source and temporarily stores a FLAG representing the interrupt signal. During operation, this program operates in a non-interruptible state whereby further input of other interrupt factor signals does not cause interruption of the program;

second program: According to the interrupt source of the interrupt signal, makes the CPU 30 obey the corresponding interrupt handling program; during execution of this second program, the microcomputer is in an interrupt inhibit or non-interruptible state;

third program: Interrupt handling programs to be selectively executed in response to interrupt signals corresponding to the interrupt source of the interrupt signals; and fourth or main program: Executed when no interrupt is taking place.

Various interrupt factor signals may be generated in the internal combustion engine 60 and fed into the input/output unit 20. For example, the interrupt factor signals may be sensor signals such as, a crank pulse signal generated at a certain crank rotational position with respect to a crank standard position will be inputted to the input/output unit 20 as one of the interrupt factor signals. When an interrupt factor signal is inputted to the input/output unit 20, an interrupt signal is fed to the CPU 30 to change the operation state of the CPU 30 into an interrupt state. Thus, the input/output unit 20 is provided with an interrupt signal generating circuit 22 which generates an interrupt signal in response to various interrupt factor signals fed from the internal combustion engine 60. Although it is not so illustrated clearly, the interrupt signal generating circuit 22 further includes a register R which has FLAG storage locations for temporarily storing, respectively, digital signals representing the interrupt request signals. The interrupt signals generated by the interrupt signal generating circuit 22 are transmitted through a lead 34 to the CPU 30 to make the CPU enter into the interrupt state. Interrupt processing operation of the microcomputer is then started at the foregoing first program. At the first stage of the first program, a checking operation for detecting FLAGs in register R is performed by the CPU 30. At this time, storage in register R, which causes an interrupt in the CPU, is cleared. During processing of the first program, a process to be rapidly handled in response to the interrupt signal takes place. It is possible to restrict generation of the interrupt signal when an interrupt factor signal is inputted, by operation of a program. It is further possible to make the interrupt routine remain in a pending state by an operation of the program, even when the interrupt signal is inputted to the CPU 30.

If there are some interrupt factor signals which have not yet been processed, FLAGs representing such interrupt factor signals are temporarily stored in the locations of register R of the interrupt signal generating circuit. Each FLAG stored in the register R is cleared during processing of the first program after completion of the required processing operation by the CPU. Preferably, clearing the storage register R will be carried out at the first block of the next cycle of the first program.

In the second program, storage in register R is checked in a given order. When the interrupt request signal corresponding to the contents of the register R is identified, the interrupt handling program, one of the third programs, corresponding to the identified interrupt request, is executed. When an interrupt signal is inputted during execution of the third program, the third program is interrupted and the first program is executed to process the inputted interrupt request signal. At this time, the interrupted third program is transferred to the RAM. For enabling the CPU 30 to return to the block of the third program at which the third program was interrupted, after finishing the interrupt processing program, an interrupt flag $F_{IQR}$ is generated and stored. The interrupt flag $F_{IQR}$ may be stored in an interrupt flag register, for example. Presence of the interrupt flag $F_{IQR}$ is checked at the last step of the first program. When the interrupt flag $F_{IQR}$ is set, control passes to execute the interrupted program. On the other hand, if the interrupt flag $F_{IQR}$ is not set, control skips to start the second program. At this time, if no interrupt request signals registered in register R are detected during execution of the first program, the fourth program is executed.

It should be noted that, when the second program is executed to check register R and there are a plurality of FLAGs set in this register, the interrupt programs corresponding thereto, i.e., the third programs, are executed in the order in which the set FLAGs are detected.

According to the above-mentioned system of the present invention, for processing an interrupt, only seven bytes of RAM for transferring the previous program during execution of the interrupt processing program are necessary. Further, since the interrupt request signals are temporarily stored when inputted, the present invention can reduce the amount of memory required for storing the interrupt queue. For example, take the case of Motorola's microprocessor Model No. 6800, which is structured to transfer the values in the program counter, the index register, and the accumulators to the RAM. For storing these values, seven bytes of RAM are used. In the conventional interrupt processing method, since five transfers may possibly occur and each transfer requires seven bytes of RAM, thirty-five bytes of RAM should be provided. As opposed to this, according to the present invention, only a maximum of fourteen bytes of RAM are used for transfers, because only a maximum of two transfers can be made. When the fourth program is executed and an interrupt is then processed, the fourth program is transferred to seven bytes of RAM, and, during execution of the third program, if an interrupt occurs, the previous third program is transferred, using seven bytes of RAM. In other words, according to the present invention, at the maximum only two interrupts are processed, and so transfers occur at maximum of two times.

Figure 2:
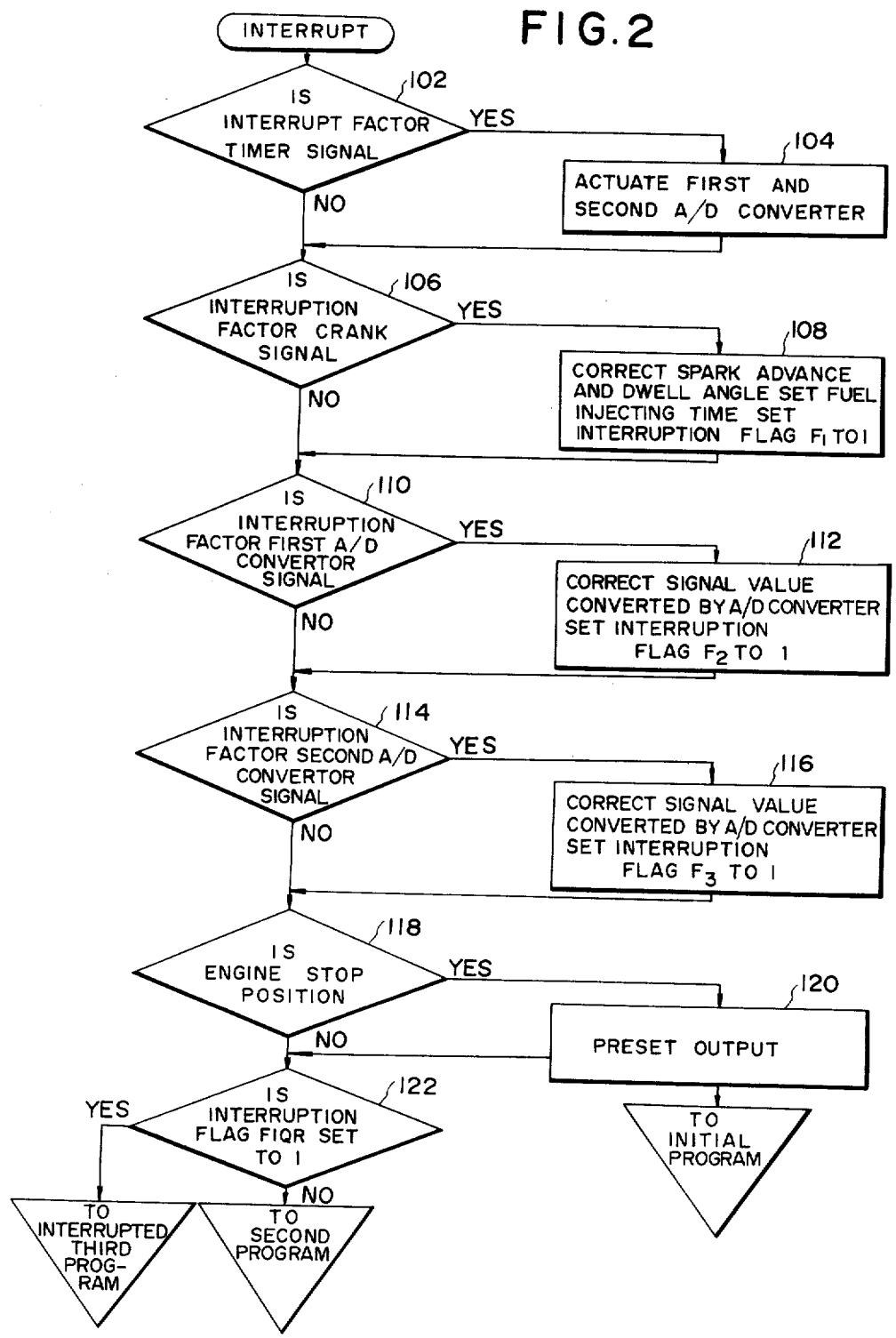
FIG. 2 is a flowchart of a first program in a multiprogramming system, according to a preferred embodiment of the present invention.

Now, referring to FIG. 2, there is illustrated and shown a flowchart of the first interrupt processing program to be executed by the microcomputer system shown in FIG. 1. There is illustrated, as an example, a program to process five interrupt request signals, in which two of them can be completed in the first program. In the shown example, the five interrupt request signals are as follows:

(1) A clock signal generated by a timer; for example a signal generated once every 10.24 ms;
(2) A crank pulse signal generated at a certain rotational crank position with respect to crank standard angle, for example at 120°;
(3) a first A/D converter signal which is generated when the first A/D converter finishes its converting operation;
(4) a second A/D converter signal which is generated when the second A/D converter finishes its converting operation; and
(5) a detector signal which is generated in response to the engine stopping.

When an interrupt request signal is inputted to the input/output unit 20, the interrupt signal generating circuit 22 generates an interrupt signal to be fed to the CPU 30. In response to the interrupt signal, the CPU 30 passes control to execute the first program. In a first decision step 102, the interrupt signal is checked to see whether it is due to the clock signal. If the interrupt signal is due to the clock signal, control passes to a block 104. In block 104, instruction signals to actuate the first and second A/D converters or to actuate an auxiliary timer which has a minimum unit adapted to the one cycle of the timer are generated. After processing by block 104, or if the interrupt signal is not due to the clock signal, control passes to a decision step 106, wherein the interrupt signal is checked to see whether it is due to the crank pulse signal. If the interrupt signal is due to the crank pulse signal, in a block 108, the spark advance and dwell angle of the spark ignition system is corrected, corresponding to the crank pulse signal. During this block 108, a value determining fuel injection time is also generated and fed back to the output circuit of the input/output unit 20. Further, during block 108, an interrupt flag $F_1$ is set to the value "1" and set in the interrupt flag register R. The interrupt flag $F_1$ corresponds to one of the third programs (hereafter referred as "third program I"). After block 108, or if the interrupt is not due to the crank pulse signal, control passes to a decision step 110, wherein the interrupt signal is checked to see whether it is a signal showing that the first A/D converter has finished its converting operation. If such a first A/D converter interrupt signal is detected, the value of the signal as converted by the first A/D converter is corrected, so that the value may be used by other programs. At the same time, an interrupt flag $F_2$ is set to "1" and registered in the interrupt flag register R. After block 112, or if the interrupt signal is not due to the first A/D converter signal, control passes to a decision step 114, wherein the interrupt signal is checked to see whether it is due to the second A/D converter signal. If the interrupt signal is due to the second A/D converter signal, control passes to block 116, wherein the value of the signal as converted by the second A/D converter is corrected so that the value may be used by other programs. At the same time, an interrupt flag $F_3$ is set to the value "1" and set in the interrupt flag register R. If the interrupt signal is not due to the second A/D converter signal, or after finishing block 116, a check is made to see whether the interrupt signal is due to the engine stop signal. If the interrupt signal is due to the engine stop signal, the microcomputer 10 is operated to preset the output corresponding to an engine stop condition at a processing step 120. Thereafter, control is transferred to the fourth program. After the block 120 or if the decision of the decision step 118 is NO, control passes to a decision step 122, wherein the interrupt flag $F_{IQR}$ is checked. If interrupt flag $F_{IQR}$ is set in the interrupt flag register R, control returns to the interrupted step of the third program. If the interrupt flag $F_{IQR}$ is not set, then the second program, as shown in FIG. 3, is executed.

Figure 3:
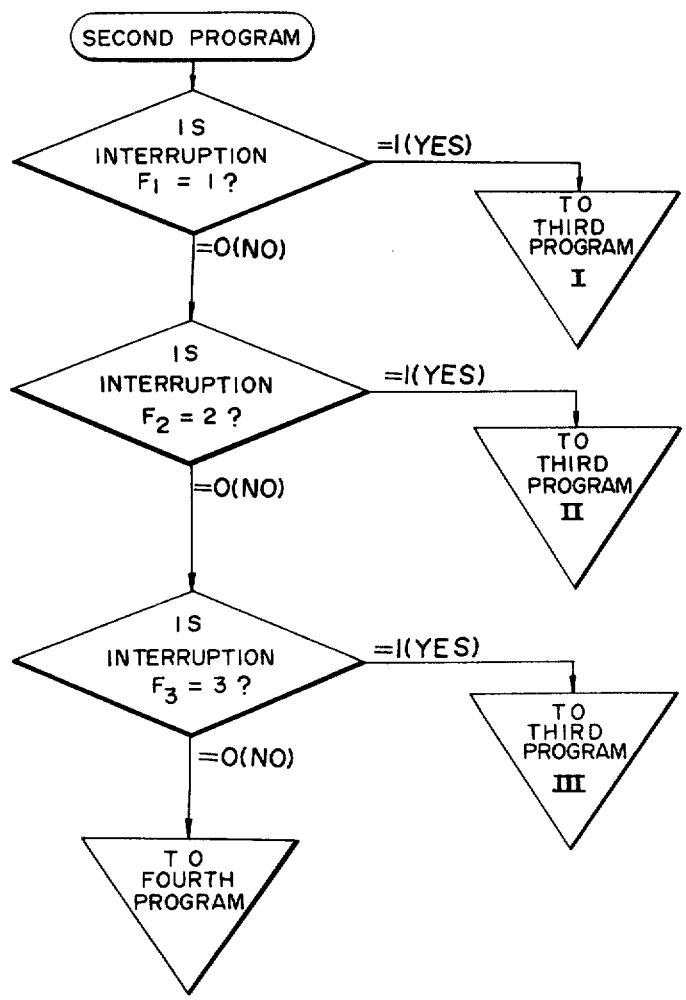
FIG. 3 is a flowchart of a second program in the multiprogramming system of the preferred embodiment.

FIG. 3, is a flowchart of the second program. The second program has three decision steps 202, 204, and 206. The decision steps 202, 204 and 206 check the interrupt flags $F_1$, $F_2$ and $F_3$ in that order. If setting of one of the interrupt flags $F_1$, $F_2$ or $F_3$ is detected, an instruction for executing the third program corresponding to the detected interrupt flag is fed to the CPU. As stated above, the interrupt flag $F_1$ corresponds to the third program I, the flag $F_2$ corresponds to the third program II, and the flag $F_3$ corresponds to the third program III. On the other hand, if there is no setting of any interrupt flag in the interrupt flag register R, the fourth program is executed.

During execution of the third program I, the CPU calculates a value to be processed in dependence on a crank pulse signal indication of engine speed. This value may be the control parameter for fuel injection timing. For example, since the time between injecting fuel into an engine cylinder and exhausting exhaust gas therefrom is inversely proportional to engine speed, feedback control (λ-control) for the fuel injection amount is performed to determine the control duty cycle in dependence on the engine speed. During execution of the third program I, the CPU further operates to correct the fuel injection timing control data in response to an oxygen sensor signal which is fed from an oxygen sensor provided in the exhaust gas passage. At this time, the CPU further operates to determine the control value to be fed for controlling the engine speed to a desired speed and to feed a control signal for the engine speed.

When the third program II is executed, the CPU operates to process control data indicative of air flow rate for fuel injection timing and to output a control signal to a fuel injection system. This operation is carried out depending on air flow rate which is inputted from an air flow meter in the form of an analog signal and is converted by the first A/D converter. In practice, the air flow rate is measured at a fixed given instant which is defined by a timer, so that the measured air flow rate is a sample value, for convenience of processing.

During execution of the third program III, the CPU determines an order for carry out conversions in the second A/D converter. According to the instructions fed from the CPU, the second A/D converter converts various sensor signals, such as, for example, an oxygen sensor signal, a coolant temperature coolant, a battery charge signal, or the like, into digital code amenable for processing by the CPU.

Figure 4:
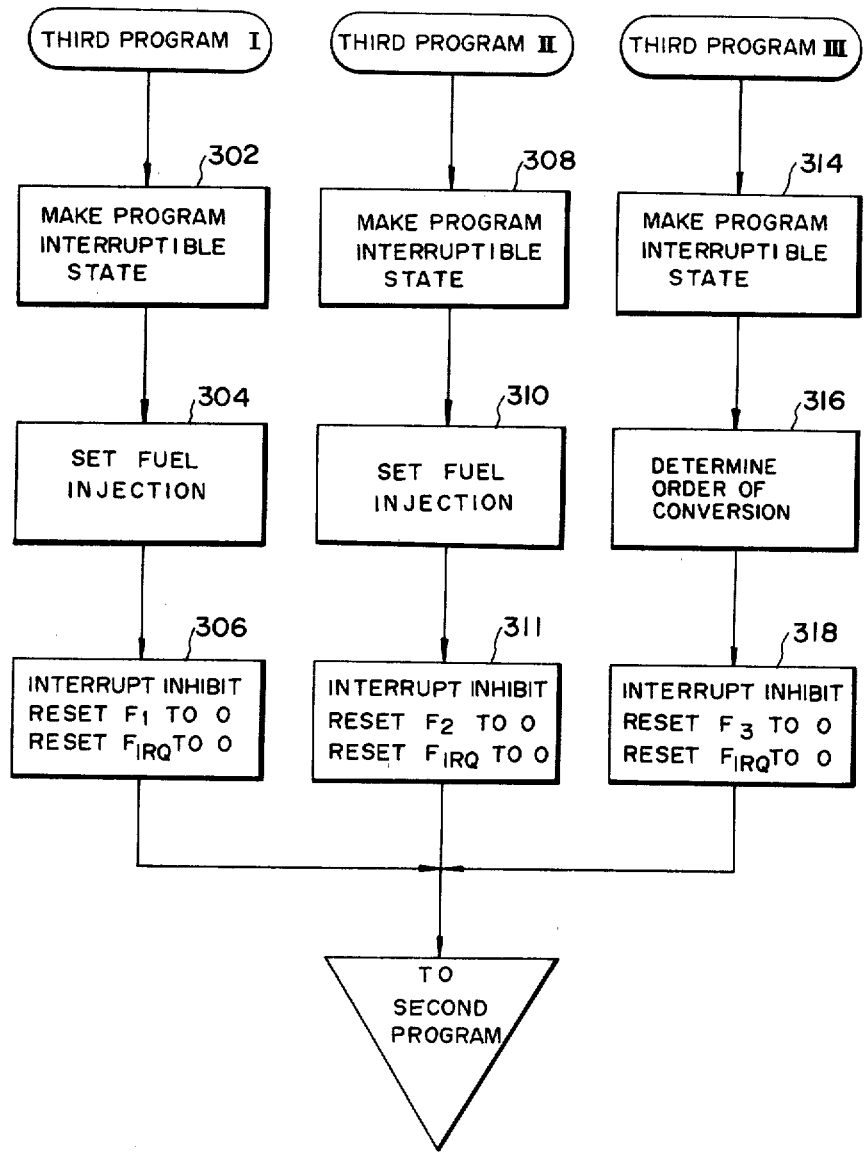
FIG. 4 is a flowchart of a third group of programs in the multiprogramming system of the preferred embodiment.

FIG. 4 is a flowchart of the group of third programs I, II and III. In each of the third programs, in its first block 302, 308 or 314, the program is put into the interruptible state. In this state, if another interrupt request signal is inputted and thereby an interrupt signal is inputted to the CPU, the currently active third program is interrupted and the first program is executed. After execution of the first program is finished, execution of the third program is continued. In blocks 304 and 310 of the third programs I and II, actual control operation, as mentioned above for the fuel injection system, is carried out. On the other hand, in block 316 of the third program III, the determination of an order of conversion of various sensor signals is made. After the actual operation, each of the third programs is put into interrupt inhibit state and the relevant interrupt flag $F_{IQR}$, $F_1$, $F_2$, or $F_3$ is cleared to the value "0", in a block 306, 312 or 318. Thereafter, control is transferred to the second program.

Figure 5:
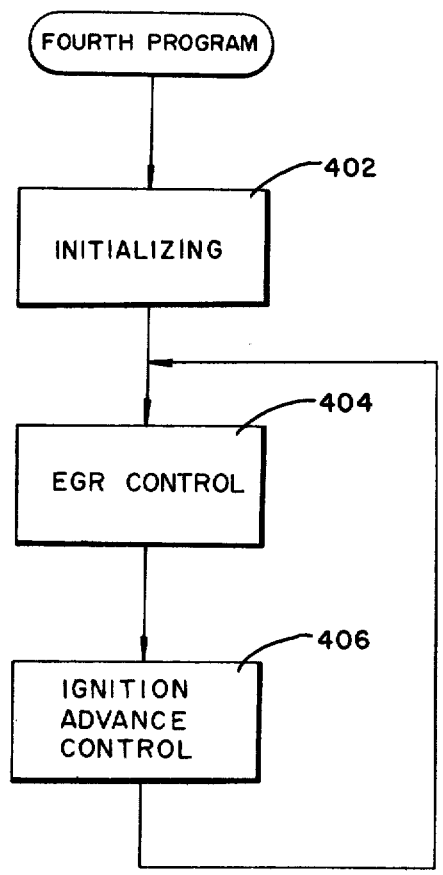
FIG. 5 is a flow chart of a fourth group in the multiprogramming system of the preferred embodiment.

FIG. 5 is a flowchart of the fourth program. A processing step 402 is an initializing block to be executed when an electric source is being charged or when the engine is stopped. In the normal driving condition, blocks 404 and 406 are alternatively repeated for controlling exhaust gas recirculation rate and spark advance of the ignition system of the engine.

Figure 6:
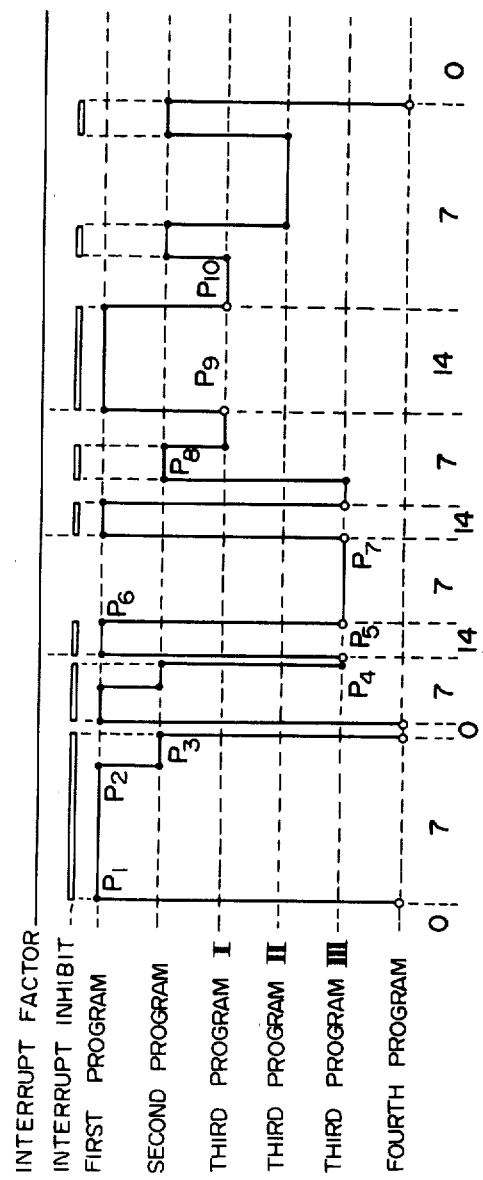
FIG. 6 is a time-chart of execution of the operation multiprogramming system of the shown embodiment of the present invention.
Figure 7:
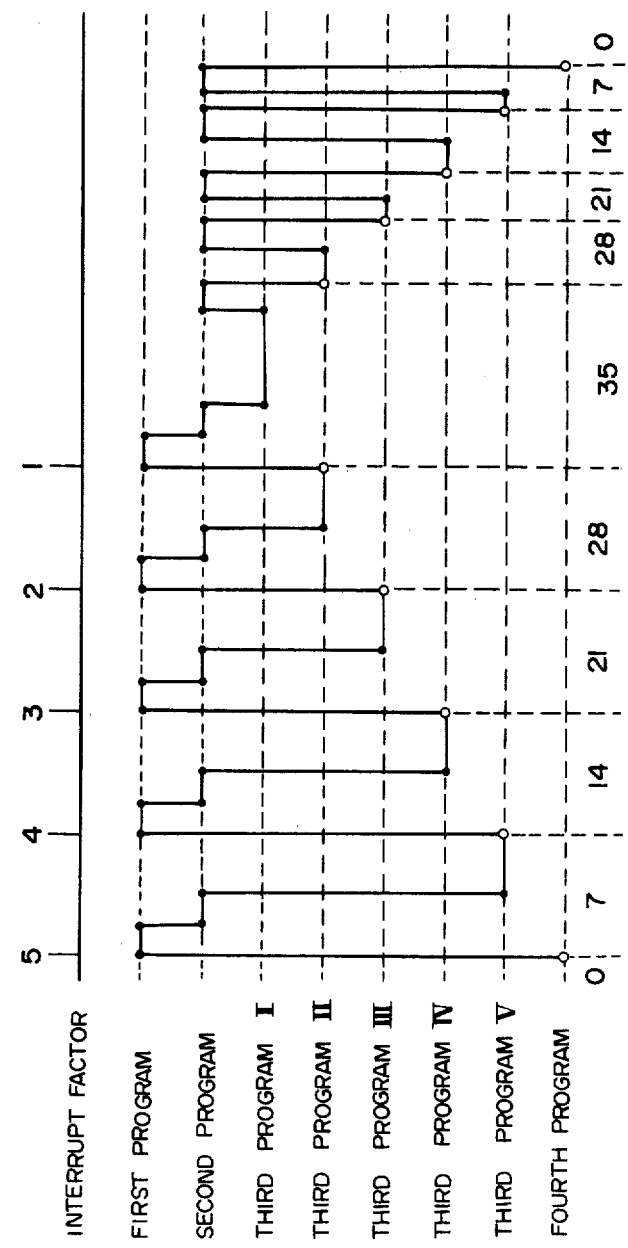
FIG. 7 is a time-chart of the operation of the multiprogramming system of a prior art form.

Now we refer to FIGS. 6 and 7, wherein there are shown timecharts of the operation of a multiprogramming system according to the present invention, and of one according to a conventional system. FIG. 6 is a timechart of the multiprogramming system as shown in FIGS. 2 to 5, in which a filled circle (·) denotes the end of a program; an open circle (º) denotes an interrupt of a program; and the number in the lowermost column is numbers of bytes of the RAM used for storing an interrupt routine. During execution of the fourth program, if an interrupt signal is inputted at a time $P_1$, and the cause of the interrupt request is engine stop condition, the fourth program is then interrupted and the first program starts running. During execution of the first program, the initializing operation is performed in response to the engine stopping. At this time, for storing the fourth program, seven bytes of RAM are used. At the end of the first program, at a time $P_2$, the second program starts execution. If there is no interrupt request waiting to be processed by the third program, then the operation of the CPU returns to the fourth program at the end of the second program, at a time $P_3$. Thereby, execution of the interrupted fourth program is resumed. However, if another interrupt request signal is inputted while the first and second programs are being executed, it is inhibitted and put into interrupt pending condition. Immediately after the fourth program starts execution, the program condition becomes interruptible. In response to the waiting interrupt signal, again the first program starts to be executed. After execution of the first and second programs, if the cause of the interrupt request is the second A/D converter signal, the value of the interrupt flag $F_3$ is "1" during execution of the second program, and then the third program III, corresponding to this second A/D converter signal, is executed, at a time $P_4$. If another interrupt signal, being due to the first A/D converter signal, is inputted, during execution of the third program III, which occurs, in the shown example, at time $P_5$, then the currently executing third program III is interrupted, and the first program starts to run. At this time, the third program III is transferred to the RAM. Thereby, fourteen bytes of the RAM are used for storing interrupted programs, i.e., the first seven bytes for storing the fourth program and the next seven bytes for storing the third program. During execution of the first program, the value of the interrupt flag $F_2$ is made "1" and is registered in the interrupt flag register R at the time $P_6$ when the first program reaches its end, and then the interrupt flag $F_{IQR}$ is detected so as to bring back the third program III and the the third program III is executed from the interrupted position. When a further interrupt factor signal, which is due to the engine speed signal, is inputted at a time $P_7$ during execution of the third program III, the third program III is again interrupted and the first program is executed. During execution of the first program, the interrupt flag $F_1$ is set to the value "1" and is registered in the interrupt flag register R. Therefore, at this time, in the interrupt flag register are registered the interrupt flags $F_1$ and $F_2$. Then, control returns to the third program III in response to the interrupt flag $F_{IQR}$. At the end of the third program III, the interrupt flags $F_{IQR}$ and $F_3$ are cleared, and control passes to the second program, at a time $P_8$. During execution of the second program, the interrupt flags $F_1$ to $F_3$ are searched for in the register in order. Thus the interrupt flag $F_1$ is detected first. In response to this interrupt flag $F_1$, the third program I starts running. At a time $P_9$, if the clock signal is inputted as an interrupt factor signal, the third program I is interrupted, and the value of the interrupt flag $F_{IQR}$ is set to "1". The interrupt flag $F_{IQR}$ is then registered in the interrupt flag register R. Then the first program is executed to actuate the first and second A/D converters. At this time, the third program I is transfered to seven bytes of RAM. Thereby, fourteen bytes of the RAM are used for storing the fourth program and the third program I. At the end of the first program, the interrupt flag $F_{IQR}$ is detected to return control to the interrupted point of the third program I. At the end of the third program I, the interrupt flags $F_{IQR}$ and $F_1$ are cleared and then control passes to the second program, at a time $P_{10}$. During execution of the second program, the interrupt flag $F_2$ is detected, so as to make the third program II run. At the end of the third program II, the interrupt flags $F_{IQR}$ and $F_2$ are cleared, and then the second program is again executed to seek for further interrupt flags in the register R. Since, in this case, there is no further interrupt flag set, then control returns to the fourth program.

As apparent from FIG. 6, according to the above-mentioned multiprogramming system in use with this microcomputer system, according to the present invention, a maximum of fourteen bytes of RAM are used for transferred programs. This should be compared with the conventional system, shown in FIG. 7, wherein is illustrated a prior art method for interrupts. As seen from FIG. 7, in response to each interrupt signal, the first and second programs are executed. Further, when an interrupt signal is inputted, the previously executed program is transferred to the RAM, to join the interrupt queue. Since each interrupted program requires seven bytes of RAM to be transferred, and in the shown example transfers are performed five times, thirty-five bytes of RAM are required.

As mentioned above, the interrupt system according to the present invention is advantageous for reducing the capacity of the RAM needed to be used for transfer, which, in turn, results in increasing the capacity of the RAM available to be used for program. This is beneficial, particularly, for a microcomputer mounted on an automotive vehicle, as due to space and other reasons, the size and scale of the microcomputer is seriously restricted.

It will be noted again that the present invention, although above described with respect to an engine control system, can be applied to control of various devices of a vehicle, such as control of a transmission or transaxle, a braking system, various driver indicators, an air conditioning system, and so on. It is also capable of controlling various devices in combination. Further, the interrupt requests can be varied, corresponding to required control operations and to the devices required to be controlled, as a matter of course. For example, interrupt request signals can be a combination of clock signals and A/D converter signals or only vehicle speed.

Although the present invention has been shown and described with respect to a preferred embodiment, it should not be considered as being limited to this or mere and simple generalizations, or other detailed embodiments. Alterations can be made to the form and the details of any particular embodiment without departing from the principles of the present invention. Therefore, it is desired that the scope of the present invention and the breadth of the protection sought to be granted by Letters Patent should be defined solely by the accompanying claims.

What is claimed is

1. A method for controlling various components of an automotive vehicle having a central processor for controlling said components in response to a stored main control program, a plurality of interruption programs, and an interruption processing program, said main control program operative for controlling specified vehicle components on said vehicle when no interruption signals are produced, said plurality of interruption programs operative for effecting preset control operations of said vehicle components, and said interruption processing programs operative in response to said interruption signals for relating a received interruption signal to one of said interruption programs, said method comprising:

generating a plurality of sensor signals, each of said sensor signals being related to a vehicle operating parameter;

producing said interruption signals in response to certain of said sensor signals;

executing said main control program when no interruption signals are being produced;

interrupting the execution of said main control program when an interruption signal is received and transferring data related to said main control program to an auxiliary memory, and executing said interruption processing program in a non-interruptible state;

executing the interruption program related to said received interruption signal;

interrupting the execution of said interruption program related to said received interruption signal when an additional interruption signal is present and storing data related to the interrupted interruption program in said auxiliary memory, and re-executing said interruption processing program for storing a FLAG identifying the interruption program related to said additional interruption signal;

continuing to execute said interruption program related to said received interruption signal;

repeating the step of interrupting the execution of said interruption program related to said received interruption signal in the presence of each additional interruption signal;

executing interruption programs related to said additional interruption signals after completion of the execution of said interruption program related to said received interruption signal in accordance with a priority determined by said stored FLAGs;

after completion of all interruption programs corresponding to said additional interruption signal, continuing the execution of said main control program;

producing control signals for said vehicle components in accordance with said interruption programs and said main control program; and actuating said vehicle components in response to said control signals.

2. The method as recited in claim 1 wherein the step of generating a plurality of sensor signals comprises the steps of:

generating a first signal indicative of crank shaft angle position, generating a second signal indicative of intake air flow rate, generating a third signal indicative of exhaust gas oxygen concentration, and generating a fourth signal indicative of engine temperature, said main and interruption programs responsive at least to said first, second, third and fourth signals for controlling at least exhaust gas recirculation, spark ignition timing and fuel injection timing.

3. The method as recited in claim 1 or 2 wherein the step of executing said main control program comprises the step of controlling exhaust gas recirculation.

4. The method as recited in claim 1 or 3 wherein the step of executing said main control program comprises the step of controlling ignition timing.

5. The method as recited in claim 1 or 2 wherein the steps of executing said interruption program related to said received and additional interruption signals comprises controlling fuel injection timing.

* * * * *